G. P. ALLEN.
Weeding-Hoe.

No. 54,087.

Patented Apr. 24, 1866.

Witnesses:

Inventor:
George P. Allen

UNITED STATES PATENT OFFICE.

GEORGE P. ALLEN, OF WOODBURY, CONNECTICUT.

IMPROVEMENT IN WEEDING-HOES.

Specification forming part of Letters Patent No. 54,087, dated April 24, 1866.

*To all whom it may concern:*

Be it known that I, GEORGE P. ALLEN, of Woodbury, in the county of Litchfield and State of Connecticut, have invented a new and Improved Weeding-Hoe; and I do hereby declare that the following is a full, clear, and exact description thereof, which will enable others skilled in the art to make and use the same, reference being had to the accompanying drawings, forming a part of this specification, in which—

Figure 1:
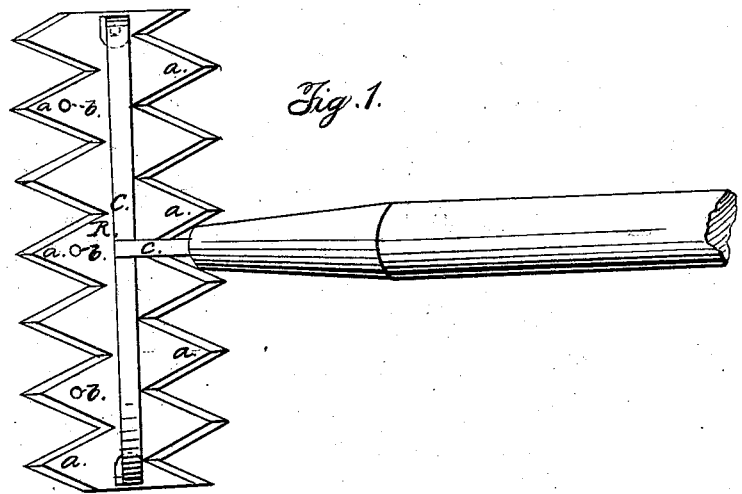
Figure 2:
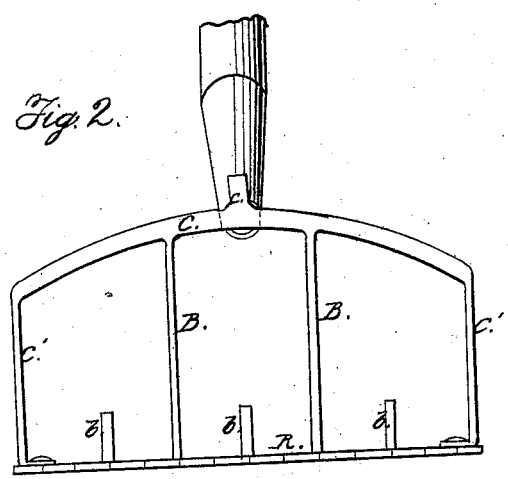
Figure 3:
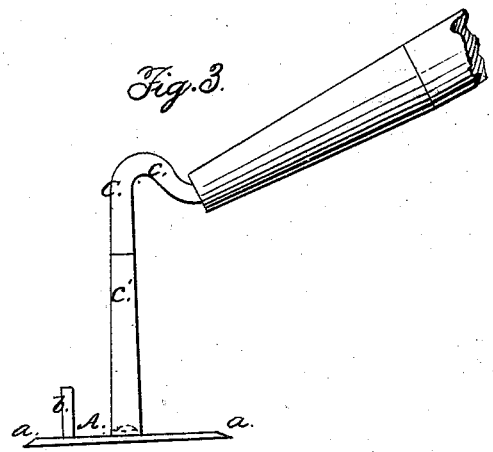

Figure 1 is a plan or top view of my invention. Fig. 2 is a back elevation. Fig. 3 is an end elevation.

Similar letters of reference indicate like parts.

This invention is designed for a weed-cutter for clearing out the weeds among onions, beets, carrots, and similar crops sown in drills, and it combines with such implement a common garden-rake.

My invention consists in the construction of of a blade with zigzag teeth on both of its edges and in providing the said teeth with pins extending above and, if desired, below the teeth, and in connecting the blade to the handle by upright pieces connected to an arm, which is provided with a shank for securing the device to the handle of the hoe.

A designates the blade of the hoe, which is a strip of metal having edges cut in zigzag manner to form saw-teeth $a\,a$, which teeth are sharpened on the edges to form efficient cutters. This form of teeth enables the implement to be operated much more easily and more effectively, besides rendering it less liable to clog and become dulled by contact with stones. As many as desired of the teeth are provided with pins $b$, which are shown as projecting from the upper surfaces of the outer or back row of teeth, but which may be also secured to the inner teeth, and so as to extend not only from the top, but also from the bottom, of the hoe-blade.

B B are upright strips which extend from the blade up to an arm, C, whose ends C' are attached to the ends of the hoe-blade. The arm C carries a shank, $c$, which is secured to the handle in the ordinary way. The pins $b$ and uprights B B serve the purpose of rake-teeth for stirring up the surface of the earth above the cutters, and also below it if they are arranged to extend from the under side of the blade. The ends C' of the arm C serve as guides to enable the operator to cut close to the crop without fear of injuring the plants.

This is a simple implement, and in it is combined a weed-cutter or scuffle-hoe and a garden-rake.

What I claim as new, and desire to secure by Letters Patent, is—

1. The cutter-blade A, constructed substantially as described.

2. The pins $b$ in the cutters A, which, with the uprights B, give to the implement the advantages of a common rake.

3. The combination of the cutter-blade A, pins $b$, uprights B, as described, and handle $c$, arranged and operating in the manner and for the purpose herein specified.

GEORGE P. ALLEN.

Witnesses:
   JAS. HUNTINGTON,
   HEMEN BOTSFORD.